(12) United States Patent
Dong (10) Patent No.: US 12,348,998 B2
(45) Date of Patent: Jul. 1, 2025

(54) TRANSMISSION MEASUREMENT METHOD, TRANSMISSION MEASUREMENT DEVICE AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 413 days.

(21) Appl. No.: 17/783,242

(22) PCT Filed: Dec. 9, 2019

(86) PCT No.: PCT/CN2019/124125
§ 371 (c)(1),
(2) Date: Jun. 7, 2022

(87) PCT Pub. No.: WO2021/114053
PCT Pub. Date: Jun. 17, 2021

(65) Prior Publication Data
US 2023/0012708 A1    Jan. 19, 2023

(51) Int. Cl.
| H04W 24/10 | (2009.01) |
| H04B 7/024 | (2017.01) |
| H04B 7/06 | (2006.01) |
| H04B 17/24 | (2015.01) |
| H04L 25/02 | (2006.01) |
| H04W 84/12 | (2009.01) |

(52) U.S. Cl.
CPC ........... *H04W 24/10* (2013.01); *H04B 7/024* (2013.01); *H04W 84/12* (2013.01)

(58) Field of Classification Search
None
See application file for complete search history.

(56) References Cited

U.S. PATENT DOCUMENTS

| 10,928,505 | B1* | 2/2021 | Chu ...................... G01S 13/765 |
| 10,986,600 | B1* | 4/2021 | Chu ........................ G01S 5/021 |
| 11,641,633 | B1* | 5/2023 | Cao .................... H04W 56/0045 370/336 |

(Continued)

FOREIGN PATENT DOCUMENTS

| CN | 102201891 A | 9/2011 |
| CN | 107979402 A | 5/2018 |

(Continued)

OTHER PUBLICATIONS

Junghoon Suh, "Sounding for AP Collaboration", 2019-09-16, IEEE 802.11-19/1535r2 (Year: 2019).*

(Continued)

Primary Examiner — Jeffrey M Rutkowski
Assistant Examiner — Ning Li
(74) Attorney, Agent, or Firm — Cozen O'Connor (57) ABSTRACT

A transmission measurement method includes: generating a measurement message frame that does not include a data part, in which the measurement message frame includes long training fields (LTFs) and the number of the LTFs is determined based on the number of antennas of an access point (AP); and transmitting the measurement message frame.

14 Claims, 8 Drawing Sheets

S11 generating a measurement message frame that does not comprise a data part, wherein the measurement message frame comprises LTFs

S12 transmitting the measurement message frame (56) References Cited

U.S. PATENT DOCUMENTS

| | | | | |
|---|---|---|---|---|
| 2012/0300874 | A1* | 11/2012 | Zhang | H04L 69/22 375/295 |
| 2015/0288427 | A1* | 10/2015 | Wang | H04W 72/542 370/329 |
| 2016/0262051 | A1* | 9/2016 | Merlin | H04B 7/0626 |
| 2017/0070914 | A1* | 3/2017 | Chun | H04L 1/0075 |
| 2017/0279507 | A1* | 9/2017 | Kim | H04B 7/0874 |
| 2018/0159609 | A1 | 6/2018 | Yu et al. | |
| 2019/0007977 | A1* | 1/2019 | Asterjadhi | H04W 74/006 |
| 2019/0081664 | A1 | 3/2019 | Vermani et al. | |
| 2019/0165883 | A1* | 5/2019 | Chun | H04W 84/12 |
| 2019/0268914 | A1* | 8/2019 | Adachi | H04W 72/542 |
| 2019/0349232 | A1* | 11/2019 | Cariou | H04B 7/0417 |
| 2020/0045555 | A1* | 2/2020 | Huang | H04W 72/20 |
| 2020/0059808 | A1* | 2/2020 | Lim | H04W 72/04 |
| 2020/0336176 | A1* | 10/2020 | Seok | H04B 7/0626 |
| 2021/0044333 | A1* | 2/2021 | Jiang | H04B 7/0619 |
| 2021/0068151 | A1* | 3/2021 | Patil | H04W 4/70 |
| 2022/0030611 | A1* | 1/2022 | Oteri | H04W 72/20 |

FOREIGN PATENT DOCUMENTS

| | | |
|---|---|---|
| CN | 109714092 A | 5/2019 |
| WO | WO 2012149847 A1 | 11/2012 |
| WO | WO 2018076788 A1 | 5/2018 |

OTHER PUBLICATIONS

European Patent Application No. 19955920.4, Search and Opinion dated Jul. 27, 2023, 9 pages.
Suh, J. et al. "Sounding for AP Collaboration" Huawei, doc.: IEEE 802.11-19/1535r2, Sep. 2019, 27 pages.
Indian Patent Application No. 202247038662, Office Action dated Oct. 13, 2022, 6 pages.
PCT/CN2019/124125 English translation of International Search Report dated Aug. 27, 2020, 2 pages.

* cited by examiner

| frame control | duration | receiver address | transport address | common info | user info | ...... | slave AP info | ...... |

TRANSMISSION MEASUREMENT METHOD, TRANSMISSION MEASUREMENT DEVICE AND STORAGE MEDIUM

CROSS-REFERENCE TO RELATED APPLICATION

This application is a U.S. national phase of International Application No. PCT/CN2019/124125, filed on Dec. 9, 2019, the entire content of which is incorporated herein by reference.

TECHNICAL FIELD

The disclosure relates to the field of communication technologies, and more particularly, to a transmission measurement method, a transmission measurement device and a storage medium.

BACKGROUND

To enhance the access rate and the throughput of wireless local area network (WLAN) technologies such as wireless fidelity (Wi-Fi), IEEE802.11 established study group (SG) IEEE802.11be to study a next-generation mainstream Wi-Fi technology (802.11a/b/g/n/ac/ax).

To enhance the transmission rate and the transmission quality more efficiently, a beamforming mechanism is employed for a transmission measurement in the next-generation mainstream Wi-Fi technology (IEEE802.11ac/ax).

The beamforming mechanism in the related art is aimed at the transmission measurement mechanism for one beamformer. However, there is no transmission measurement mechanism for multiple beamformers.

SUMMARY

According to a first aspect of embodiments of the disclosure, a transmission measurement method is provided, which includes: generating a measurement message frame that does not include a data part, in which the measurement message frame includes long training fields (LTFs) and the number of the LTFs is determined based on the number of antennas of an access point (AP); and transmitting the measurement message frame.

According to a second aspect of embodiments of the disclosure, a transmission measurement method is provided, which includes: receiving measurement message frames from APs, in which the measurement message frame includes LTFs and the number of the LTFs is determined based on the number of antennas of an AP; and transmitting a measurement message feedback frame.

According to a third aspect of embodiments of the disclosure, a transmission measurement device is provided, which includes: a processor; and a memory for storing instructions executable by the processor; in which the processor is configured to perform the transmission measurement method as described in the first aspect.

According to a fourth aspect of embodiments of the disclosure, a transmission measurement device is provided, which includes: a processor; and a memory for storing instructions executable by the processor; in which the processor is configured to perform the transmission measurement method as described in the second aspect.

According to a fifth aspect of embodiments of the disclosure, a non-transitory computer-readable storage medium is provided. When instructions stored in the storage medium are executed by a processor of a mobile terminal, the mobile terminal is caused to perform the transmission measurement method as described in the first aspect.

According to a sixth aspect of embodiments of the disclosure, a non-transitory computer-readable storage medium is provided. When instructions stored in the storage medium are executed by a processor of a mobile terminal, the mobile terminal is caused to perform the transmission measurement method as described in the first aspect.

It is to be understood that both the foregoing general description and the following detailed description are exemplary and explanatory only and are not restrictive of the disclosure.

BRIEF DESCRIPTION OF THE DRAWINGS

The drawings, which are incorporated in and constitute a part of this specification, illustrate embodiments consistent with the disclosure and, together with the specification, serve to explain the principles of the disclosure.

DETAILED DESCRIPTION

Reference will now be made in detail to embodiments, examples of which are illustrated in the drawings. The following description refers to the drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The method provided in embodiments of the disclosure is appliable to a WLAN communication system including a data transmitting device and a data receiving device. The data transmitting device and the data receiving device can be a station (STA) or an access point (AP). Data fronthaul and backhaul between the data transmitting device and the data receiving device are performed through the WLAN.

The STA involved in the disclosure can be understood as a user terminal in the WLAN. The user terminal can be referred to as a user equipment (UE), a mobile station (MS), a mobile terminal (MT) or the like, which is a device that provides voice and/or data connectivity to a user. For example, the terminal may be a handheld device or an in-vehicle device or the like, with a wireless connection function. At present, some examples of terminals are smart phones, pocket personal computers (PPCs), handheld computers, personal digital assistants (PDAs), notebook computers, tablet computers, wearable devices, Internet of Things (IoT) clients, in-vehicle devices or the like.

The AP involved in the disclosure refers to a device, a router or the like through which the user terminal in the WLAN accesses to the network.

In the related art, IEEE 802.11 standard is used for data frame transmission between the STA and the AP. At present, IEEE802.11 established SG IEEE802.11be to study the next-generation mainstream Wi-Fi technology (802.11a/b/g/n/ac/ax). The studying scope includes 320 MHz bandwidth transmission and the aggregation and coordination of frequency bands. The proposed vision is to increase the rate and throughput by at least four times compared with the existing IEEE802.11ax. Its main application scenarios are video transmission, augmented reality (AR), virtual reality (VR), etc.

The aggregation and coordination of frequency bands refers to simultaneous communication in the frequency bands or in the bandwidths in the same frequency band, for example, simultaneous communication in the three frequency bands of 2.4 GHz, 5.8 GHz and 6-7 GHz. Simultaneous communication in the frequency bands or in the bandwidths in the same frequency band can be understood as multi-connection communication or multi-link aggregation (MLA).

Measurement is performed between the AP and the STA before data exchange is performed between the AP and the STA, to better improve the spectrum utilization efficiency. To enhance the transmission rate and the transmission quality more efficiently, the beamforming mechanism (IEEE802.11ac/ax respectively) is used for measurement in the related art, such as FIGS. 1A to 1D. Referring to FIGS. 1A to 1D, before the measurement starts, the data transmitting terminal (beamformer) transmits a sounding trigger message frame (a non-data packet (NDP) announcement frame), for example, a very high throughput (VHT) NDP announcement frame or a high efficiency (HE) NDP announcement frame. After a certain period of time, for example, a short inter-frame space (SIFS), a measurement message frame such as a NDP frame or a beamforming report poll (BFRP) frame is transmitted. After receiving the NDP frame, the data receiving terminal (beamformee) transmits a measurement message feedback frame for feedback, such as a high efficiency compressed beamforming/channel quality indicator (CQI). In FIGS. 1A to 1D, one data transmitting device transmits an NDP announcement frame, for example, an AP transmits an NDP announcement frame and an NDP frame. One or more STAs receive the NDP frame and transmit respectively one or more measurement message feedback frames for feedback.

However, to further enhance the spectrum utilization efficiency and the system throughput, there may be APs and STAs that exchange data at the same time, that is, there may be beamformers and beamformees. Before beamformers (APs) and beamformees (STAs) exchange data at the same time, mutual measurement and measurement protocol are performed before communication to reduce mutual interference.

Figure 1A:
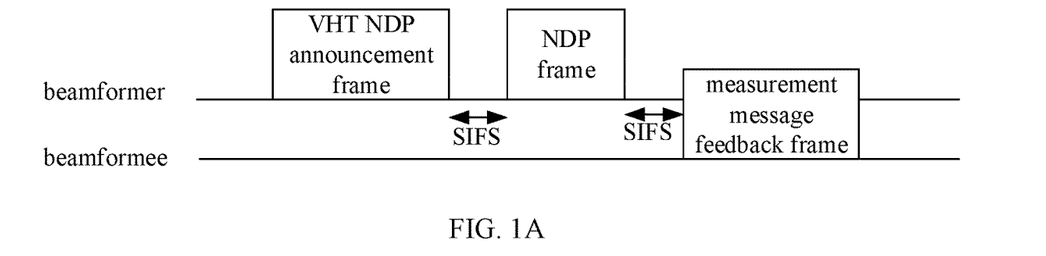
FIGS. 1A to 1D are schematic diagrams illustrating a transmission measurement of beamforming mechanism.
Figure 1B:
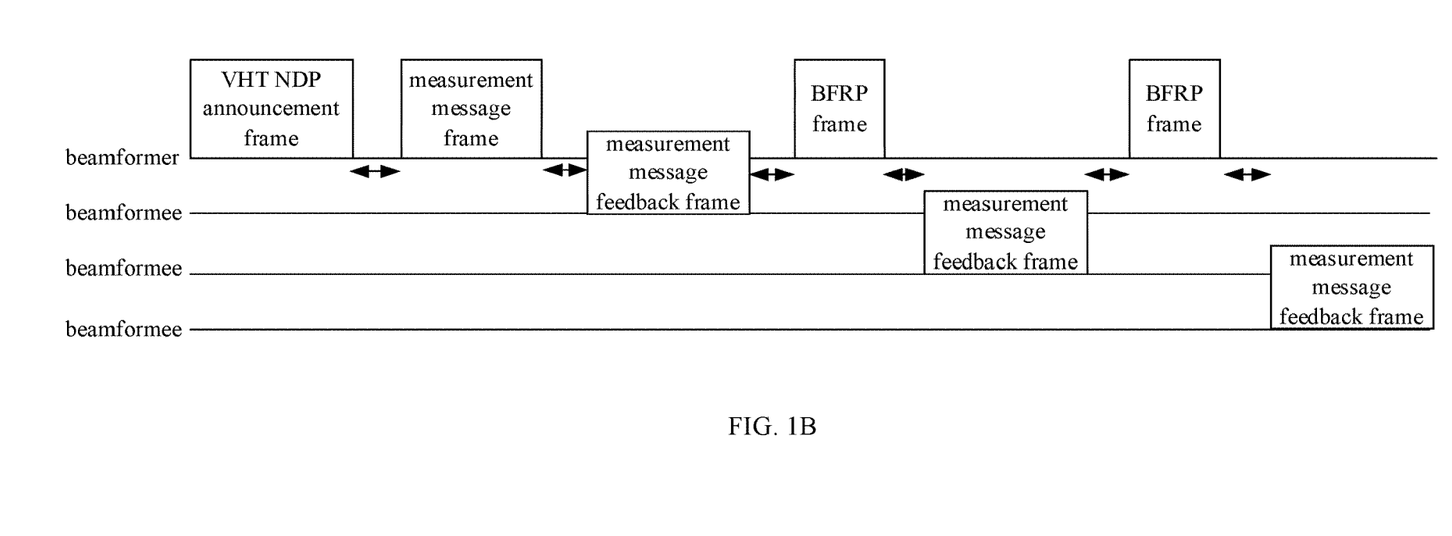
Figure 1C:
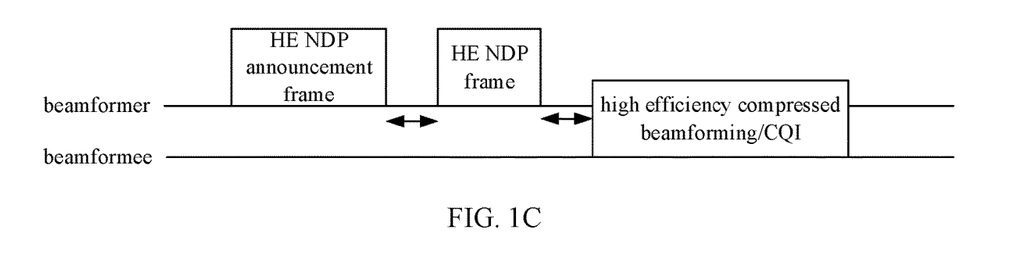
Figure 1D:
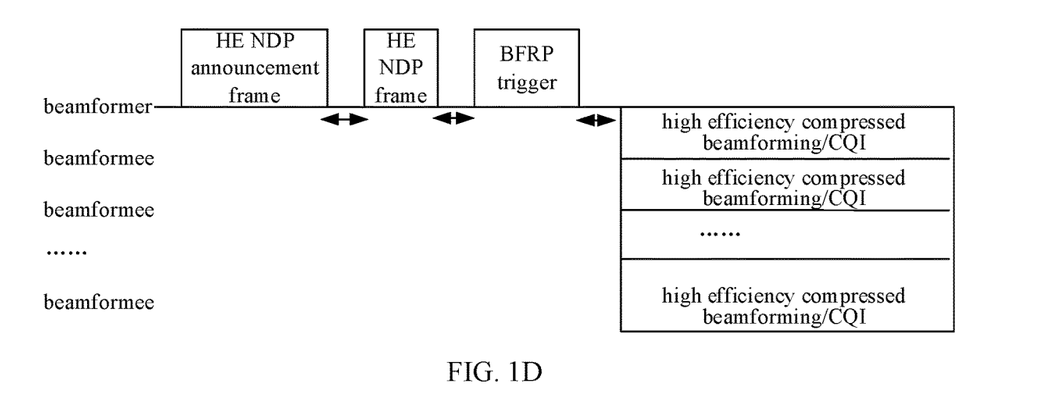
Figure 2:
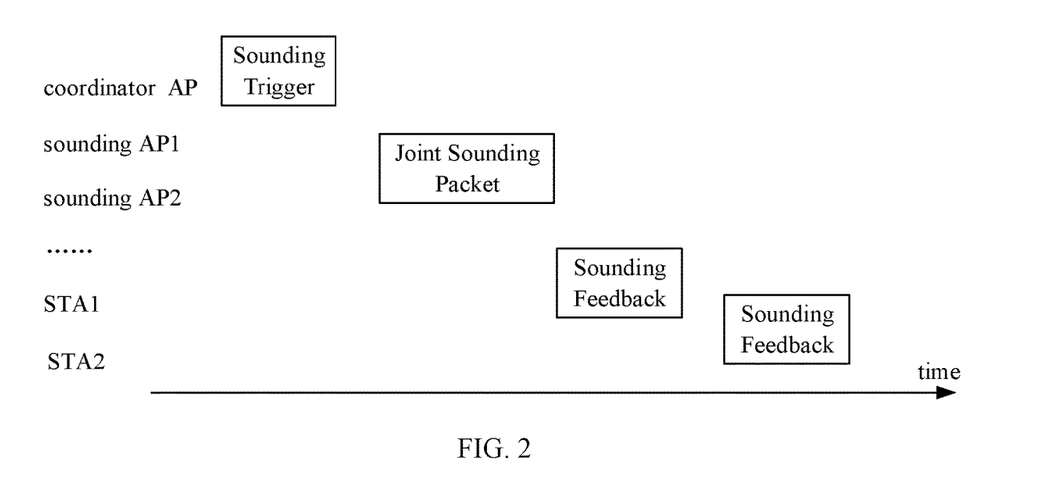
FIG. 2 is a diagram illustrating a measurement protocol between APs and STAs according to some embodiments.

FIG. 2 is a diagram illustrating a measurement protocol between APs and STAs according to some embodiments. In FIG. 2, a coordinator AP transmits a sounding trigger message frame (Sounding Trigger). A sounding AP2 and a sounding AP3 receive the Sounding Trigger and transmit a Joint Sounding Packet. The STA that receives the Joint Sounding Packet can transmit a Sounding Feedback for feedback.

However, there is no message frame format and measurement mechanism that supports the measurement protocol between APs and STAs in the related art.

In view of this, embodiments of the disclosure provide a transmission measurement method. In the transmission measurement method, a device that is used as a data transmitting device, such as an AP, generates a measurement message frame that does not include a data part, also known as an NDP frame. The generated measurement message frame includes long training fields (LTF). The number of the LTFs is determined based on the number of antennas of AP(s), which can also be understood as determining the number of the LTFs based on the number of spatial streams (SS). Therefore, determining the measurement message frames for the APs is realized. The APs transmit the measurement message frames and the STA that receives the measurement message frames transmitted by the APs can transmit a measurement message feedback frame for feedback, thereby realizing the measurement protocol between the APs and the STAs.

Figure 3:
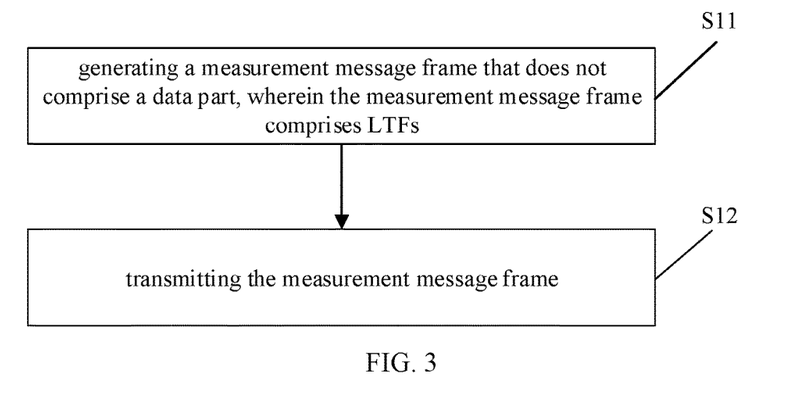
FIG. 3 is a flowchart illustrating a transmission measurement method according to some embodiments.

FIG. 3 is a flowchart illustrating a transmission measurement method according to some embodiments. As illustrated in FIG. 3, the transmission measurement method applicable to the AP includes the following.

In S11, a measurement message frame that does not include a data part is generated.

The measurement message frame generated by the AP in the disclosure includes LTFs determined according to the number of APs.

In S12, the measurement message frame is transmitted.

Each of the APs in embodiments of the disclosure may generate and transmit the measurement message frame in the above-mentioned manner. The STA or the AP that has received the measurement message frames transmitted by the APs can transmit a measurement message feedback frame for feedback and complete the transmission measurement.

Figure 4:
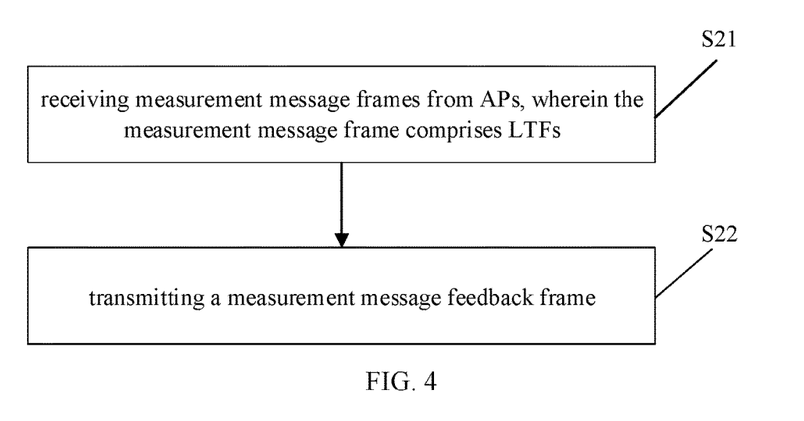
FIG. 4 is a flowchart illustrating a transmission measurement method according to some embodiments.

FIG. 4 is a flowchart illustrating a transmission measurement method according to some embodiments. Referring to FIG. 4, the transmission measurement method is applicable to a device that receives the measurement message frames, for example, an AP or an STA, which includes the following.

In S21, measurement message frames from APs are received.

The measurement message frame received includes LTFs. The number of the LTFs is determined based on the number of antennas at AP(s).

In S22, a measurement message feedback frame is transmitted.

In embodiments of the disclosure, the measurement message frames transmitted and received between the APs and the STAs include the LTFs, and the number of the LTFs is determined based on the number of antennas of the AP(s). The transmission measurement between the APs and the STAs may be realized.

In some embodiments of the disclosure, the measurement message frame further includes an identification bit for characterizing whether measurement message frames are transmitted sequentially or jointly. For example, the identification bit is a bit, in which a first value of the bit represents the sequential transmission of the measurement message frames and a second value of the bit represents the joint transmission of the measurement message frames. For example, the identification bit is one bit, "1" represents the joint transmission of the measurement message frames and "0" represents the sequential transmission of the measurement message frames.

When the identification bit represents the sequential transmission, the number of the LTEs is the number of the antennas of the AP. For example, if the number of antennas of AP1 is 4, the number of the LTFs is 4. If the number of antennas of AP2 is 8, the number of the LTFs is 8.

When the identification bit represents the joint transmission, the number of the LTFs is the total number of antennas of all APs for the joint transmission or the number of antennas of an AP with a largest number of antennas among all APs for the joint transmission. For example, if the number of antennas of AP1 is 4 and the number of antennas of AP2 is 8, the number of the LTFs is 12 or the number of the LTFs is 8.

Figure 5:
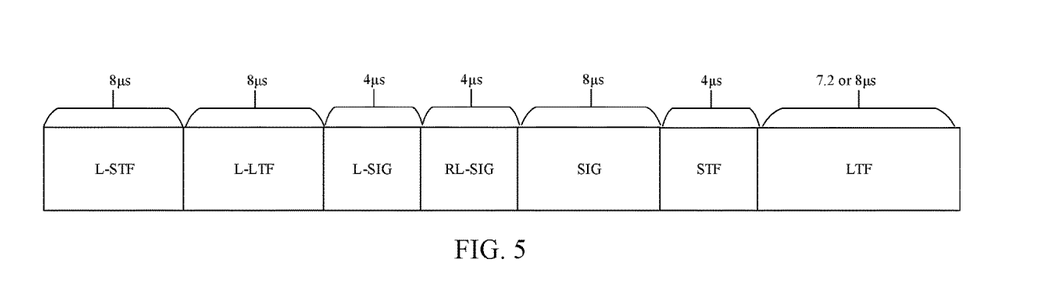
FIG. 5 is a schematic diagram illustrating a format of a measurement message frame according to some embodiments.

FIG. 5 is a schematic diagram illustrating a format of a measurement message frame according to some embodiments. Referring to FIG. 5, the format of the measurement message frame is successively a legacy-short training field (L-STF) which occupies 8 μs, a legacy-long training field (L-LTF) which occupies 8 μs, a legacy-signal (L-SIG) which occupies 4 μs, a repeated legacy-signal (RL-SIG) which occupies 4 μs, a signal (SIG) which occupies 8 μs, a STF which occupies 4 μs, and a LTF which occupies 7.2 μs or 8 μs.

In yet another embodiment of the disclosure, the measurement message frame may be triggered to be transmitted by a trigger message frame. The trigger message frame may also be referred to as a "trigger frame", which may be understood as the aforementioned Sounding Trigger and NDP announcement frame.

Figure 6:
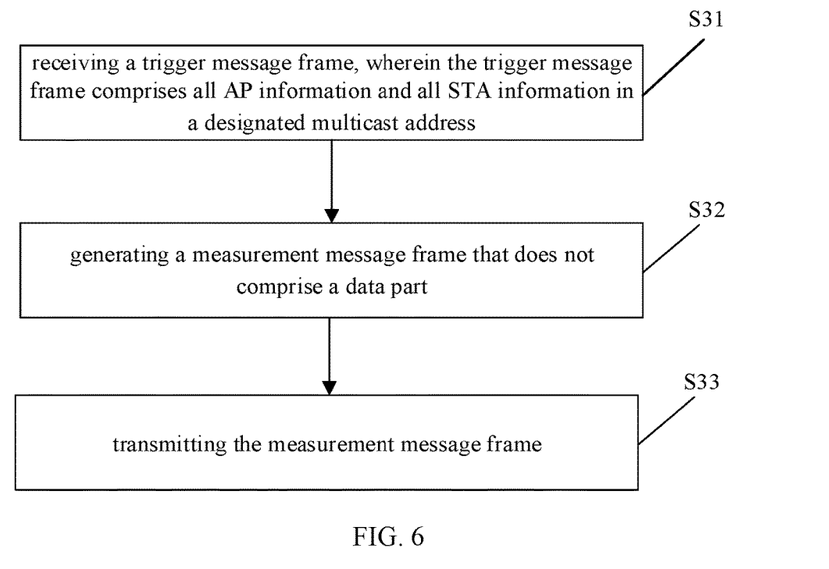
FIG. 6 is a flowchart illustrating a transmission measurement method according to some embodiments.

FIG. 6 is a flowchart illustrating a transmission measurement method according to some embodiments. The transmission measurement method is applicable to an AP and includes the following.

In S31, a trigger message frame is received, in which the trigger message frame includes all AP information and all STA information in a designated multicast address.

In embodiments of the disclosure, the trigger message frame may be transmitted by the coordinator AP. The AP that receives the trigger message frame generates a measurement message frame.

In S32, a measurement message frame that does not include a data part is generated.

In S33, the measurement message frame is transmitted.

It is understood that the AP that receives the measurement message frame in embodiments of the disclosure may also serve as the coordinator AP to transmit the trigger message frame.

Figure 7:
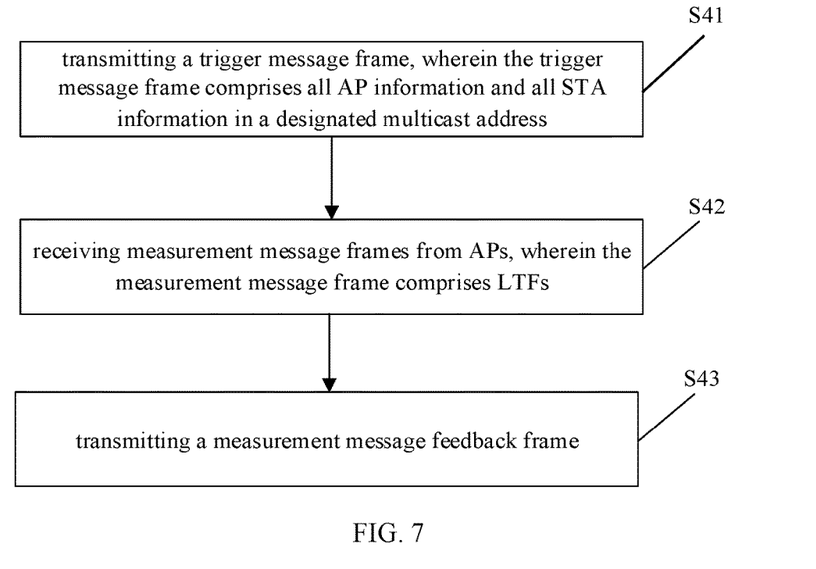
FIG. 7 is a flowchart illustrating a transmission measurement method according to some embodiments.

FIG. 7 is a flowchart illustrating a transmission measurement method according to some embodiments. The transmission measurement method is applicable to an AP and includes the following.

In S41, a trigger message frame is transmitted, in which the trigger message frame includes all AP information and all STA information in a designated multicast address.

In S42, measurement message frames from APs are received, in which the measurement message frame transmitted by AP includes LTFs.

The number of the LTFs is determined based on the number of antennas at AP(s).

In S43, a measurement message feedback frame is transmitted.

In embodiments of the disclosure, a format of the trigger message frame will be described below.

Figure 8:
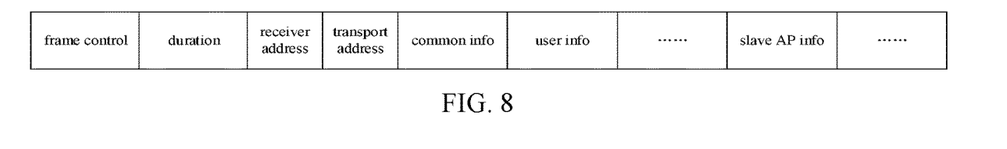
FIG. 8 is a schematic diagram illustrating a format of a trigger message frame according to some embodiments.

FIG. 8 is a schematic diagram illustrating a format of a trigger message frame according to some embodiments.

As illustrated in FIG. 8, the trigger message frame includes frame control, duration, receiver address, transport address, common info, user info and slave AP info. The receiver address is the multicast address. The user info and slave AP info are all slave AP information and all STA information in the multicast address in the receiver address.

In an implementation manner, the STA information includes an AP identifier and an association identifier (AID). The AP identifier is a basic service set identifier (BSSID) or a service set identifier (SSID). The BSSID can be 48 bits.

The BSSID may be a BSSID of a slave AP or a BSSID of an AP that transmits the trigger message frame. In addition, the AP identifier may be an identifier assigned to a slave AP by an AP that transmits the trigger message frame, which may be a 16-bit identifier and is different from the BSSID. The AID is a unique identifier in a basic service set (BSS) which is assigned by the AP to the STA during the association process.

In an implementation manner, the STA information further includes the number of resource units (RU), or the number of spatial streams, or the number of RUs and the number of spatial streams. The number of the RUs may be the number of RUs allocated by the STA under a certain bandwidth, which is identified by RU allocation. SS allocation, including a starting stream and the number of streams, means that communication channels are measured.

In an implementation manner, the slave AP information includes an AP identifier. The AP identifier can be a BSSID or an identifier assigned by an AP that transmits the trigger frame.

It can be understood that the transmission measurement method provided in embodiments of the disclosure is applicable to a process of data exchange between the APs and the STAs. In the process of data exchange between the APs and the STAs, the APs and the STAs involved in the foregoing embodiments are applied to implement the process of transmission measurement, which may refer to the relevant description of the foregoing embodiments and will not be described in detail herein.

The format of the trigger message frame and the format of the measurement message frame, provided in embodiments of the disclosure, are suitable for the transmission measurement before the data exchange between the APs and the STAs. The trigger message frame includes all AP information and all STA information in the designated multicast address and can trigger the APs or the STAs to transmit the trigger message frame. The trigger message frame includes the LTFs determined based on the number of antennas of the AP(s) or STA(s). The transmission measurement for the APs and the STAs may be realized.

Based on the same concept, embodiments of the disclosure also provide a transmission measurement apparatus.

It can be understood that, the transmission measurement apparatus provided in embodiments of the disclosure includes hardware structures and/or software modules for performing each function to realize the above-mentioned functions. In combination with units and algorithm actions of examples disclosed in the disclosure, embodiments of the disclosure can be implemented in a form of hardware or a combination of hardware and computer software. Whether a certain function is executed by hardware or software-driven hardware depends on specific applications and design constraint conditions of the technical solutions. Those skilled in the art can use different methods for each specific application to implement the described functions, but such implementation should not be considered as going beyond the scope of the technical solutions of embodiments of the disclosure.

Figure 9:
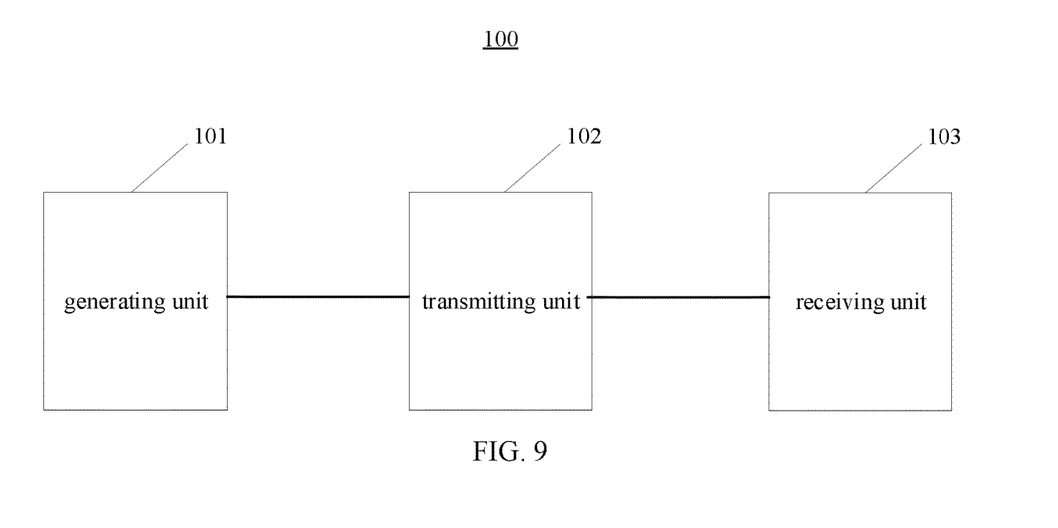
FIG. 9 is a block diagram illustrating a transmission measurement apparatus according to some embodiments.

FIG. 9 is a block diagram illustrating a transmission measurement apparatus according to some embodiments. Referring to FIG. 9, the transmission measurement apparatus 100 includes a generating unit 101 and a transmitting unit 102.

The generating unit 101 is configured to generate a measurement message frame that does not include a data part, in which the measurement message frame includes LTFs and the number of the LTFs is determined based on the number of antennas of an AP. The transmitting unit 102 is configured to transmit the measurement message frame.

In an implementation, the measurement message frame further includes an identification bit for characterizing sequential transmission; and the number of the LTFs is the number of the antennas of the AP.

In an implementation, the measurement message frame further includes an identification bit for characterizing joint transmission; and the number of the LTFs is the total number of antennas of all APs for the joint transmission.

In an implementation, the measurement message frame further includes an identification bit for characterizing joint transmission; and the number of the LTFs is the number of antennas of an AP with a largest number of antennas among all APs for the joint transmission.

In an implementation, the apparatus further includes: a receiving unit 103 configured to receive a trigger message frame, in which the trigger message frame includes all AP information and all STA information in a designated multicast address.

In an implementation, the STA information includes an AP identifier and an AID.

In an implementation, the AP identifier is a BSSID.

In an implementation, the BSSID is a BSSID of a slave AP or a BSSID of an AP that transmits the trigger message frame.

In an implementation, the AP identifier is an identifier assigned to a slave AP by an AP that transmits the trigger message frame.

In an implementation, the STA information further includes the number of resource units, or the number of spatial streams, or the number of resource units and the number of spatial streams.

In an implementation, the AP information includes an AP identifier.

Figure 10:
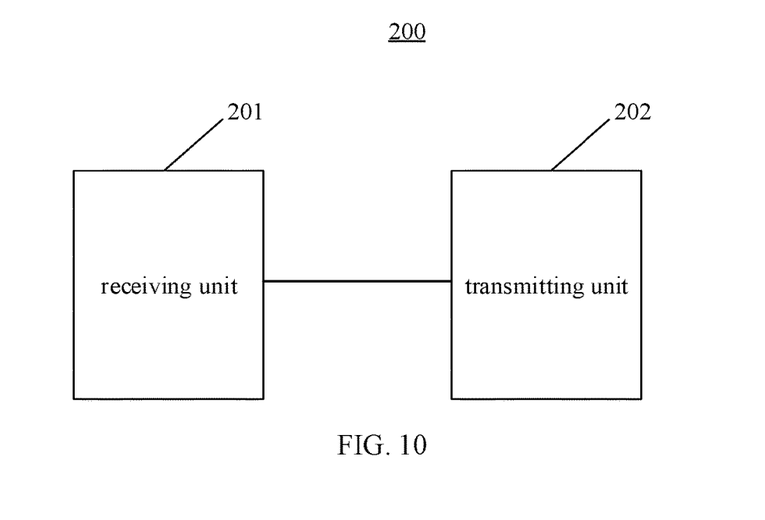
FIG. 10 is a block diagram illustrating a transmission measurement apparatus according to some embodiments.

FIG. 10 is a block diagram illustrating a transmission measurement apparatus according to some embodiments. Referring to FIG. 10, the transmission measurement apparatus 200 includes a receiving unit 201 and a transmitting unit 202. The receiving unit 201 is configured to receive measurement message frames from APs, in which the measurement message frame includes LTFs and the number of the LTFs is determined based on the number of antennas of an AP. The transmitting unit 202 is configured to transmit a measurement message feedback frame.

In an implementation, the measurement message frame further includes an identification bit for characterizing sequential transmission; and the number of the LTFs is the number of the antennas of the AP.

In an implementation, the measurement message frame further includes an identification bit for characterizing joint transmission; and the number of the LTFs is the total number of antennas of all APs for the joint transmission or the number of antennas of an AP with a largest number of antennas among all APs for the joint transmission.

In an implementation, the transmitting unit 202 is further configured to: transmit a trigger message frame, in which the trigger message frame includes all AP information and all STA information in a designated multicast address.

In an implementation, the STA information includes an AP identifier and an AID.

In an implementation, the AP identifier is a BSSID.

In an implementation, the BSSID is a BSSID of a slave AP or a BSSID of an AP that transmits the trigger message frame.

In an implementation, the AP identifier is an identifier assigned to a slave AP by an AP that transmits the trigger message frame.

In an implementation, the STA information further includes the number of resource units, or the number of spatial streams, or the number of resource units and the number of spatial streams.

In an implementation, the AP information includes an AP identifier.

With respect to the apparatus in the above embodiments, the specific manners for performing operations for individual modules therein have been described in detail in the embodiments regarding the methods for, which will not be elaborated herein.

Figure 11:
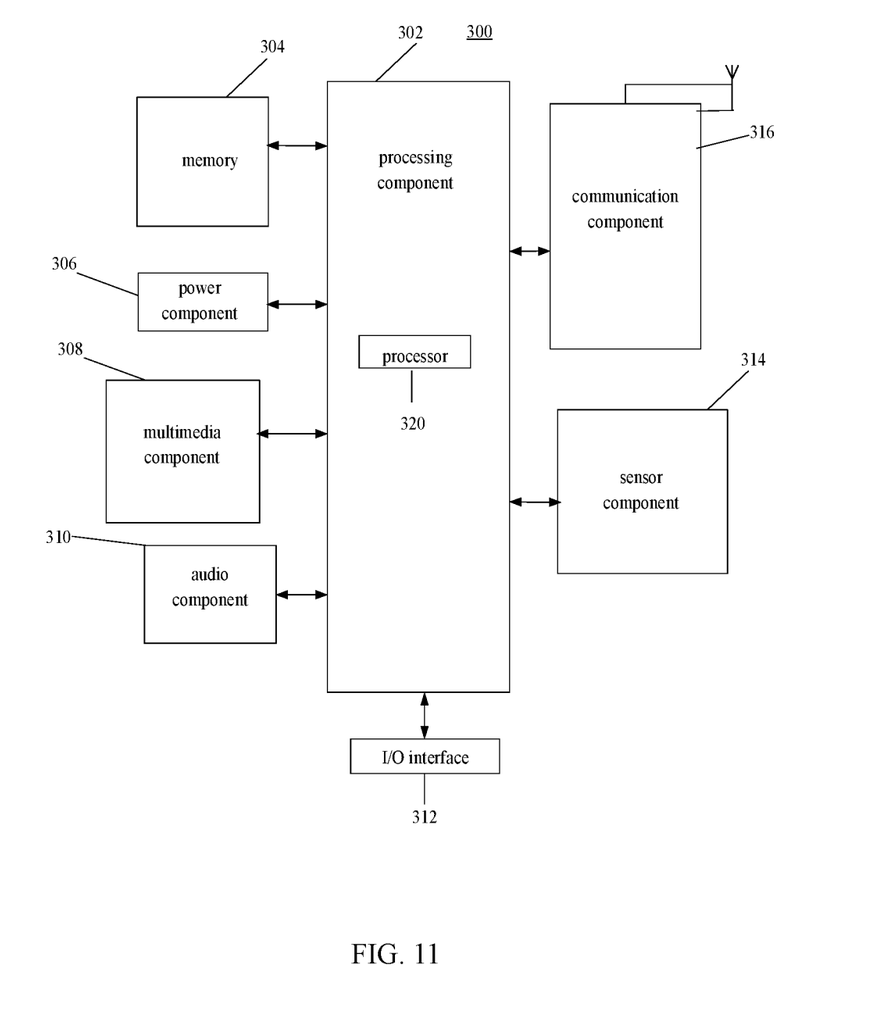
FIG. 11 is a block diagram illustrating a device according to some embodiments.

FIG. 11 is a block diagram illustrating a transmission measurement device 300 according to some embodiments. For example, the device 300 may be an AP, such as a mobile phone, a computer, a digital broadcast terminal, a messaging device, a gaming console, a tablet, a medical device, exercise equipment, a personal digital assistant, and the like.

Referring to FIG. 11, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the actions in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

Figure 12:
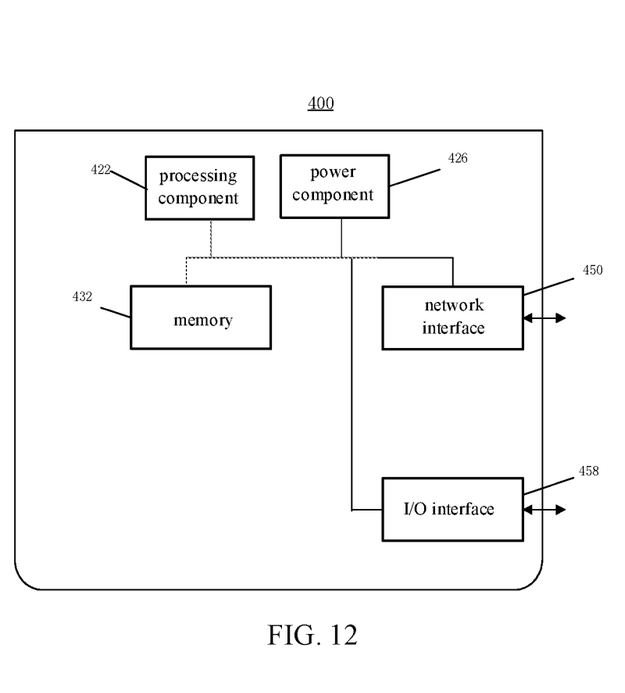
FIG. 12 is a block diagram illustrating a device according to some embodiments.

FIG. 12 is a block diagram illustrating a transmission measurement device 400 according to some embodiments. For example, the device 400 may be a STA or an AP. Referring to FIG. 12, the device 400 may include a processing component 422 which further includes one or more processors, and a memory resource represented by a memory 432 for storing instructions such as an application program that can be executed by the processing component 422. The application program stored in the memory 432 may include one or more modules each corresponding to a set of instructions. In addition, the processing component 422 is configured to execute instructions to perform the above-mentioned methods.

The device 400 may also include a power component 426 configured to perform power management of the device 400, a wired or wireless network interface 450 configured to connect the device 400 to a network, and an input/output (I/O) interface 458. The device 400 can operate based on an operating system stored in the memory 432, such as Windows Server, Mac OS X™, Unix™, Linux™, FreeBSD™ or the like.

It should be understood that "plurality" or "multiple" in the disclosure may refer to two or more, and other quantifiers are similar. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship. The singular forms of "a", "said" and "the" are also intended to include plural forms, unless the context clearly indicates other meanings.

It should be understood that although the terms first, second, and the like may be used to describe various information, the information should not be limited to these terms. These terms are only used to distinguish the same type of information from each other, and do not indicate a specific order or degree of importance. In fact, expressions such as "first" and "second" can be used interchangeably. For example, without departing from the scope of the disclosure, the first information may also be referred to as the second information, and similarly, the second information may also be referred to as the first information.

It can be further understood that although the operations in embodiments of the disclosure are described in a specific order in the drawings, they should not be understood as requiring these operations to be performed in the specific order shown or in a serial order, or requiring performing all the operations shown to get the desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A transmission measurement method, comprising:
    generating a measurement message frame that does not comprise a data part, wherein the measurement message frame comprises long training fields (LTFs) and a number of the LTFs is determined based on a number of antennas of an access point (AP); and
    transmitting the measurement message frame;
    wherein the measurement message frame further comprises an identification bit for characterizing sequential transmission or joint transmission; wherein
    in response to the identification bit characterizing the sequential transmission, the number of the LTFs is the number of the antennas of the AP; and
    in response to the identification bit characterizing the joint transmission, the number of the LTFs is the total number of antennas of all APs for the joint transmission or the number of antennas of an AP with a largest number of antennas among all APs for the joint transmission.

2. The method as claimed in claim 1, further comprising:
    receiving a trigger message frame, wherein the trigger message frame comprises all AP information and all station (STA) information in a designated multicast address,
    wherein the STA information comprises an AP identifier and an association identifier (AID);
    wherein the AP identifier is a basis service set identifier (BSSID),
    wherein the BSSID is a BSSID of a slave AP or a BSSID of an AP that transmits the trigger message frame.

3. The method as claimed in claim 2, wherein the AP identifier is an identifier assigned to a slave AP by an AP that transmits the trigger message frame.

4. The method as claimed in claim 2, wherein the STA information further comprises a number of resource units, or a number of spatial streams, or a number of resource units and a number of spatial streams.

5. The method as claimed in claim 2, wherein the AP information comprises an AP identifier.

6. A transmission measurement device, comprising:
    a processor; and
    a memory for storing instructions executable by the processor;
    wherein the processor is configured to perform the transmission measurement method as claimed in claim 1.

7. A non-transitory computer-readable storage medium having stored therein instructions that, when executed by a processor of a mobile terminal, causes the mobile terminal to perform the transmission measurement method as claimed in claim 1.

8. A transmission measurement method, comprising:
    receiving measurement message frames from access points (APs), wherein the measurement message frame comprises long training fields (LTFs) and a number of the LTFs is determined based on a number of antennas of an AP; and
    transmitting a measurement message feedback frame;
    wherein the measurement message frame further comprises an identification bit for characterizing sequential transmission or joint transmission; wherein
    in response to the identification bit characterizing the sequential transmission, the number of the LTFs is the number of the antennas of the AP; and
    in response to the identification bit characterizing the joint transmission, the number of the LTFs is the total number of antennas of all APs for the joint transmission or the number of antennas of an AP with a largest number of antennas among all APs for the joint transmission.

9. The method as claimed in claim 8, further comprising:
    transmitting a trigger message frame, wherein the trigger message frame comprises all AP information and all station (STA) information in a designated multicast address,
    wherein the STA information comprises an AP identifier and an association identifier (AID),
    wherein the AP identifier is a basis service set identifier (BSSID),
    wherein the BSSID is a BSSID of a slave AP or a BSSID of an AP that transmits the trigger message frame.

10. The method as claimed in claim 9, wherein the AP identifier is an identifier assigned to a slave AP by an AP that transmits the trigger message frame.

11. The method as claimed in claim 9, wherein the STA information further comprises a number of resource units, or a number of spatial streams, or a number of resource units and a number of spatial streams.

12. The method as claimed in claim 9, wherein the AP information comprises an AP identifier.

13. A transmission measurement device, comprising:
    a processor; and
    a memory for storing instructions executable by the processor;
    wherein the processor is configured to perform the transmission measurement method as claimed in claim 8.

14. A non-transitory computer-readable storage medium having stored therein instructions that, when executed by a processor of a mobile terminal, causes the mobile terminal to perform the transmission measurement method as claimed in claim 8.

* * * * *